(12) United States Patent
Han

(10) Patent No.: US 7,394,839 B2
(45) Date of Patent: Jul. 1, 2008

(54) METHOD AND APPARATUS FOR CONTROLLING LIGHT POWER

(75) Inventor: Suk-gyun Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 235 days.

(21) Appl. No.: 10/893,898

(22) Filed: Jul. 20, 2004

(65) Prior Publication Data

US 2005/0017998 A1   Jan. 27, 2005

(30) Foreign Application Priority Data

Jul. 24, 2003   (KR) .................. 10-2003-0051106

(51) Int. Cl.
*H01S 3/10* (2006.01)

(52) U.S. Cl. ........................... 372/24; 347/5

(58) Field of Classification Search .......... 372/29.01, 372/38.07, 5, 24; 347/29.014
See application file for complete search history.

(56) References Cited

U.S. PATENT DOCUMENTS 5,502,550 A * 3/1996 Hori et al. ............... 399/74
5,784,091 A * 7/1998 Ema et al. ............... 347/131
5,877,798 A * 3/1999 Clarke et al. ............ 347/250
6,037,966 A * 3/2000 Sakakibara .............. 347/252

FOREIGN PATENT DOCUMENTS

| JP | 62-237418 | 10/1987 |
|----|-----------|---------|
| JP | 11-65211 | 3/1999 |
| JP | 11-98330 | 4/1999 |
| JP | 2000-332349 | 11/2000 |
| JP | 2002-347271 | 12/2002 |

* cited by examiner

*Primary Examiner*—Minsun HArvey
*Assistant Examiner*—Tuan N. Nguyen
(74) *Attorney, Agent, or Firm*—Staas & Halsey LLP

(57) ABSTRACT

A method and apparatus controlling a light power, the apparatus including a light power controller, which controls a quantity of light and disposed inside the main controller disposed outside the laser scanning unit, and a light generator, which generates light and disposed inside the laser scanning unit.

17 Claims, 3 Drawing Sheets

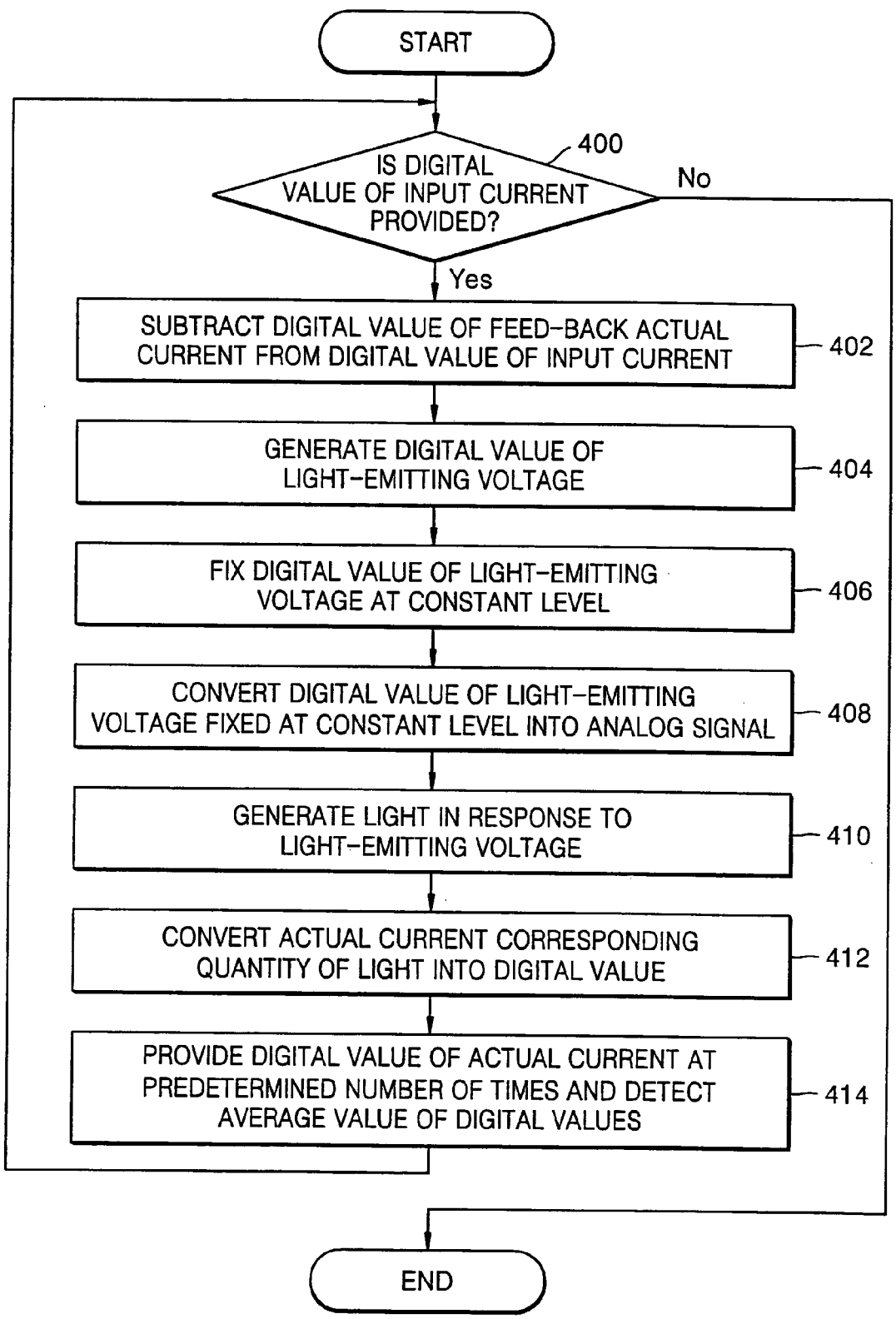

METHOD AND APPARATUS FOR CONTROLLING LIGHT POWER

CROSS-REFERENCE TO RELATED APPLICATION

This application claims the priority of Korean Patent Application No. 2003-51106, filed on Jul. 24, 2003, in the Korean Intellectual Property Office, the disclosure of which is incorporated herein by reference.

BACKGROUND OF THE INVENTION

1. Field of the Invention

The present invention relates to a printing device, such as a printer, a scanner or a multifunctional device, and more particularly, to a method and apparatus controlling a light power of a laser diode (LD) which is an element for a laser scanning unit (LSU) in a printing device.

2. Description of the Related Art

A conventional laser scanning unit (LSU) includes optical elements, such as a laser diode (LD) emitting laser light, an auto power controller (APC) maintaining a light power of the laser diode (LD) at a constant level, a collimator lens making the emitted laser light as parallel light or convergent light with respect to an optical axis, a polygon mirror scanning laser light that has passed the collimator lens at uniform speed in a horizontal direction, a cylinder lens forming an image of the laser light on the surface of the polygon mirror as a linear shape in the horizontal direction, an F-theta lens polarizing light having a predetermined refractive index with respect to the optical axis and reflected on the polygon mirror at uniform speed in a scanning direction, correcting aberration, and focusing on a scanned surface, an image-formation reflective mirror reflecting the laser light that has passed the F-theta lens and forming an image on the surface of a photosensitive drum of a printing device, a synchronous signal detection light sensor receiving the laser light and making horizontal synchronization, and a synchronous signal detection reflective mirror reflecting the laser light on the synchronous signal detection reflective mirror. The optical elements are installed in a housing and sealed. This prevents the optical elements from being contaminated from a foreign substance, such as dust or dispersion toner. In particular, the light power controller maintaining the light power of the LD at the constant level is disposed on a circuit board. The light power controller includes a laser diode driver, a field effect transistor (FET), a laser diode (LD), a light receiving unit, a variable resistor, and a threshold voltage generator.

The operation of the light power controller will now be described. If an ON signal for emitting light from the LD is input into the light power controller, the FET is conductive by the laser diode driver. If the FET is conductive, a current is applied to the LD, the LD emits light, and the light receiving unit receives light and generates a monitor current. The monitor current and the variable resistor detect a voltage, and the detected voltage is input into the threshold voltage generator. If the input voltage is higher than a threshold voltage, the threshold voltage generator generates a high H signal. If the input voltage is lower than the threshold voltage, the threshold generator generates a low L signal. The FET is turned on or off in response to the high H signal or the low L signal so that light of the LD is controlled. The quantity of light of the LD increases or decreases a value of the variable resistor so that the amount of current supplied to the LD increases or decreases. As such, a desired quantity of light can be fixed. In the conventional art, the light power controller is disposed inside the LSU and controlled by a main controller disposed outside the LSU.

However, the light power controller in a conventional analog manner adjusts the value of the variable resistor measuring the monitor current to output a desired quantity of light, thereby fixing the quantity of light emitted from the LD. Thus, even when the intensity of light should vary according to the speed of a printer, the quantity of light cannot be controlled freely. In addition, since the quantity of light is adjusted using the threshold voltage, the range of adjustment is limited. Since the light power controller is disposed inside the LSU, malfunction may occur in the light power controller due to heat caused by light emitted from the LD or vibration. In particular, due to heat, resistance of the fixed variable resistor may vary. In addition, the variable resistor should be fixed according to the quantity of light when manufacturing.

SUMMARY OF THE INVENTION

According to an aspect of the present invention, there is provided an apparatus for controlling a light power in which a light power controller is digitalized and built with a main controller and the light output quantity is easily controlled.

According to another aspect of the present invention, there is also provided a method of controlling a light power using the apparatus for controlling a light power.

According to another aspect of the present invention, there is provided an apparatus for controlling a light power in a printing device having a main controller controlling a laser scanning unit, the apparatus including a light power controller, which controls a quantity of light and is disposed inside the main controller disposed outside the laser scanning unit; and a light generator, which generates light and is disposed inside the laser scanning unit.

According to another aspect of the present invention, there is provided a method of controlling a light power performed in a printing device having a main controller controlling a laser scanning unit, the method including determining whether the digital value of an input current corresponding to a reference quantity of light emitted from a laser diode is provided; if determined that the digital value of the input current is provided, subtracting the digital value of a feedback actual current from the digital value of the input current and outputting a digital value of an error current; generating a digital value of a light-emitting voltage for emitting light from the laser diode using the digital value of the error current; converting the digital value of the light-emitting voltage into an analog signal; generating light in response to the light-emitting voltage converted into the analog signal and outputting an actual current; and converting the actual current into a digital value and determining whether the digital value of the input current corresponding to the reference quantity of light emitted from the laser diode is provided; wherein the determination of whether the digital value of an input current is provided, the subtracting of the digital value of the feedback actual current from the digital value of the input current, the generation of the digital value of the light-emitting voltage, the converting of the digital value of the light-emitting voltage into an analog signal and the converting of the actual current into a digital value are performed by the main controller.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects of the present invention will become more apparent by describing in detail exemplary embodiments thereof with reference to the attached drawings in which:

FIG. 3 is a flowchart of a method controlling a light power according to an embodiment of the present invention.

DETAILED DESCRIPTION OF THE EMBODIMENTS

Figure 1:
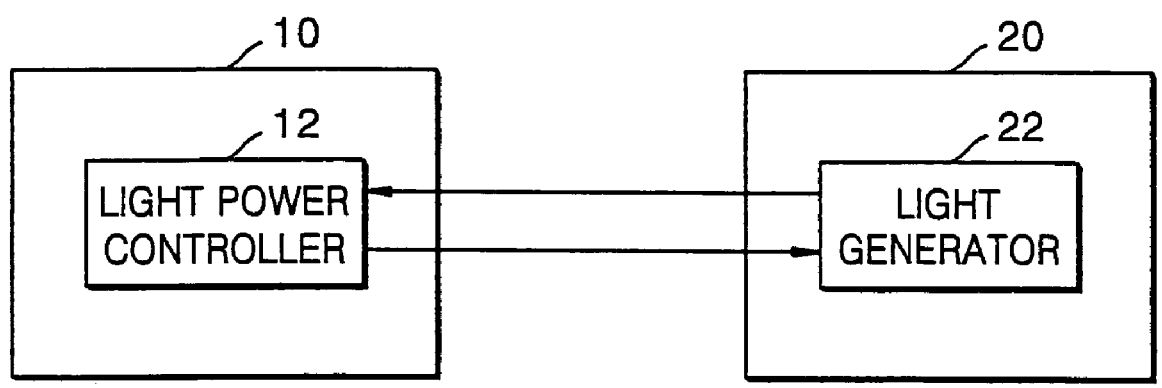
FIG. 1 is a block diagram of an apparatus controlling a light power according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus controlling a light power according to an embodiment of the present invention. The apparatus controlling a light power includes a main controller 10 and a laser scanning unit (LSU) 20. As shown in FIG. 1, a light power controller 12 is disposed inside the main controller 10. The main controller 10 having the light power controller 12 is embodied as an application specific integrated circuit (ASIC). The laser scanning unit (LSU) 20 includes optical elements, such as the above-described polygon mirror, F-theta mirror, image-formation reflective mirror, and synchronous signal detection light sensor, and further includes a light generator 22 interacting with an element of the light power controller 12. The light generator 22 generates light by receiving a light-emitting voltage converted into an analog signal. The light generator 22 includes a laser diode (LD) (not shown) and a field effect transistor (FET) (not shown).

Figure 2:
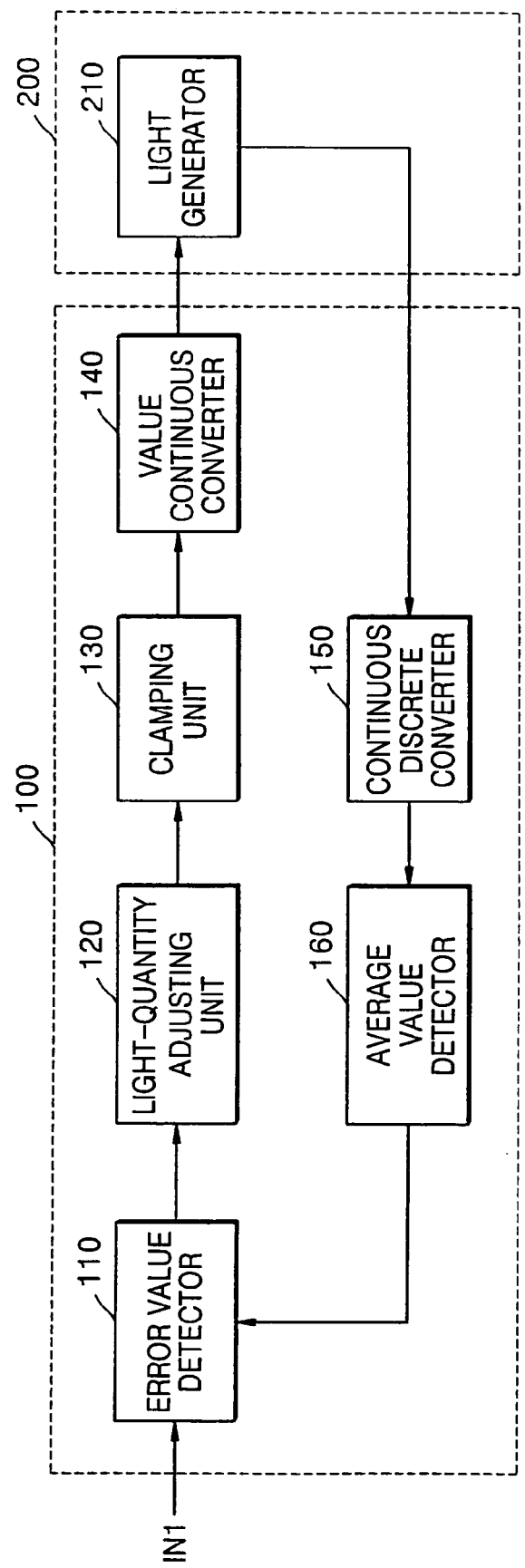
FIG. 2 is a block diagram of a light power controller of FIG. 1.

FIG. 2 is a block diagram of the light power controller 12 of FIG. 1 according to an embodiment of the present invention.

A light power controller disposed inside the main controller 100 includes an error value detector 110, a light-quantity adjusting unit 120, a clamping unit 130, a value continuous converter 140, a continuous discrete converter 150, and an average value detector 160.

The error value detector 110 subtracts a digital value of a feedback actual current from a digital value of an input current corresponding to a reference quantity of light emitted from the LD. The error value detector 110 uses a subtracter. The digital value of the feedback actual current is an average value on digital values of the actual current provided from the average value detector 160 described later. When the reference quantity of light to be emitted from the LD needs to be large, the input current corresponding to the reference quantity of light emitted from the LD is a high input current. When the reference quantity of light to be emitted from the LD needs to be small, the input current is a low input current. The digital value of the input current corresponding to the reference quantity of light may be stored in a predetermined storage space of the main controller 100 in the format of a look up table. A manipulation key or an input current selector (not shown), such as a display dialogue window selects the digital value on the input current. Thus, a user can adjust the quantity of light emitted from the LD by the input current selector.

If the digital value of the input current selected by the user is input into the error value detector 110 through an input terminal IN1, the error value detector 110 detects the digital value of the input current. In this case, the digital value of the input current input into the error value detector 110 is a value corresponding to 1000 times that of an original input current, and the average value of the digital values of the actual current input from the average value detector 160 is a value corresponding to 1000 times that of an original actual current. These values are set for computational convenience of a light-emitting voltage generated by the light-quantity adjusting unit 120 that will be described later. The error value detector 110 subtracts the digital value of the feedback actual current from the digital value of the input current and outputs a digital value of an error current in response to a digital value of a detected input current. Here, the digital value of the error current is a value corresponding to 1000 times that of an original error current.

The light-quantity adjusting unit 120 generates a digital value of the light-emitting voltage for emitting light from the LD using the digital value of the error current. Here, the light-emitting voltage is a voltage required for emitting light from the LD. The light-quantity adjusting unit 120 is a proportional integral controller and the digital value of the light-emitting voltage is obtained by Equation 1.

$$y = K_p \times E + K_i \times \int E dt \quad (1)$$

Here, y is the digital value of the light-emitting voltage, E is a digital value of the error current detected by the error value detector 110, $K_p$ is a proportional constant of the proportional integral controller, and $K_i$ is an integral constant of the proportional integral controller.

The digital value of the error current detected by the error value detector 110 is multiplied by a proportional constant, an accumulated value on the digital value of the error current is multiplied by an integral constant, and the two multiplied values are added to each other, thereby generating the digital value of the light-emitting voltage for emitting light from the LD. With respect to stability of the proportional integral controller, the proportional constant is about $K_p=0.087$, and the integral constant is about $K_i=0.046$. However, for computational convenience of the digital value, the proportional constant and the integral constant are respectively 1000 times so that $K_p=87$ and $K_i=46$. Thus, using the digital value 1000 times that of the original error current and constants 1000 times that of the original proportional constant and integral constant, the light-quantity adjusting unit 120 generates the digital value of the light-emitting voltage and outputs the generated light-emitting voltage to the clamping unit 130.

The clamping unit 130 clamps the digital value of the light-emitting voltage generated by the light-quantity adjusting unit 120 to a constant level. Clamping is done to limit variation in the digital value of the light-emitting voltage to a predetermined range. The digital value of the light-emitting voltage generated by the light-quantity adjusting unit 120 may be abnormally high or low due to noise on a system or other causes. In this case, if light is emitted from the LD using these abnormally high or low values, abnormality occurs in a laser scanning unit (LSU) 200. Thus, to prevent the abnormality, when the digital value of the input light-emitting voltage is deviated from a predetermined range of the digital value of the light-emitting voltage, the clamping unit 130 outputs a previously-input digital value of the light-emitting voltage to the value continuous converter 140. When the digital value of the input light-emitting voltage is within the predetermined range of the digital value of the light-emitting voltage, the clamping unit 130 outputs a currently-input digital value of the light-emitting voltage to the value continuous converter 140. In this case, the digital value of the light-emitting voltage output from the clamping unit 130 is multiplied by 1/1000000 for computational convenience. Thus the light-quantity adjusting unit 120 corrects 1000 times values and outputs the corrected values to the value continuous converter 140.

The value continuous converter 140 converts the clamped digital value of the light-emitting voltage into an analog signal. The value continuous converter 140 is referred to as a digital/analog (D/A) converter which converts the digital value of the light-emitting voltage into a voltage corresponding to the value. The digital value of the light-emitting voltage clamped by the clamping unit 130 is input into the value continuous converter 140, and the value continuous converter 140 converts the input digital value into the analog signal and outputs the converted analog signal to a light generator 210 of the LSU 200.

The light generator 210 generates light in response to the light-emitting voltage converted into the analog signal. The light generator 210 includes a laser diode (LD) (not shown) and a field effect transistor (FET) (not shown). In this case, the light generator 210 includes a fixed resistor (not shown), instead of a variable resistor disposed inside the conventional light power controller. This is because the quantity of light emitted from the LD is adjusted by the light-quantity adjusting unit 120 by a user's selection, thus the operation of fixing resistance using the variable resistor is not required. The light-emitting voltage converted into the analog signal by the value continuous converter 140 is input into the light generator 210, the input light-emitting voltage is applied to the LD of the light generator 210, and light is generated. Meanwhile, an actual current corresponding to the quantity of light flows through the light generator 210. The actual current flowing through the light generator 210 is output to the continuous discrete converter 150 through the fixed resistor.

The continuous discrete converter 150 converts the actual current corresponding to the quantity of light into a digital value of the actual current, and outputs the digital value of the actual current to the average value detector 160. The continuous discrete converter 150 is referred to as an analog/digital (A/D) converter which converts the input actual current into a digital value corresponding to the actual current. The actual current is input into the continuous discrete converter 150 from the light generator 210, and the continuous discrete converter 150 converts the input actual current into a digital value and outputs the converted digital value to the average value detector 160.

The digital value of the actual current converted by the continuous discrete converter 150 is input into the average value detector 160 a predetermined number of times, and the average value detector 160 detects an average value of the digital values. Due to noise from the outside, the digital values of the actual current may be abnormal. Thus, digital values of the actual current which correspond to several tens or several hundreds of times of one input current, are input into the average value detector 160, and the average value detector 160 averages the input digital values of the actual current and outputs an average digital value of the actual current to the error value detector 110. The average digital value output by the average value detector 160 to the error value detector 110 is the feedback actual current. In this case, the average value detector 160 outputs the above-described value 1000 times that of the input current and a value 1000 times that of an averaged digital value for computational convenience to the error value detector 110.

A method of controlling a light power according to the present invention will now be described with reference to the attached drawing.

FIG. 3 is a flowchart of a method of controlling a light power according to an embodiment of the present invention.

In operation 400, it is determined whether a digital value of an input current corresponding to a reference quantity of light emitted from a laser diode (LD) is provided. The digital value of the input current corresponding to the reference quantity of light may be stored in a predetermined storage space of the main controller 100 in the format of a look up table. It is determined whether the digital value on the input current is selected by a manipulation key or an input current selector (not shown), such as a display dialogue window. If determined that the digital value of the input current corresponding to the reference quantity of light emitted from the LD is not provided, the method of controlling the light power terminates.

However, if determined that the digital value of the input current is provided, that is, the digital value of the input current is selected by the user through the input current selector (not shown), in operation 402, the digital value of a feedback actual current is subtracted from the digital value of the input current. A subtracter is used to subtract the digital value of the feedback actual current from the digital value of the input current.

In operation 404, the digital value of the light-emitting voltage for emitting light from the LD is generated using the digital value of the error current. The light-emitting voltage is required for emitting light from the LD and is generated using a proportional integral controller obtained by Equation 1.

In operation 406, the digital value of the light-emitting voltage is fixed at a constant level. Due to noise on a system or other causes, the digital value of the light-emitting voltage may be abnormally high or low. Thus, clamping to limit variation in digital value of the light-emitting voltage to a predetermined range is required.

In operation 408, the digital value of the light-emitting voltage fixed at the constant level is converted into an analog signal. In order to perform operation 406, a digital/analog (D/A) converter which converts the digital value of the light-emitting voltage into a voltage corresponding to the value, is used.

In operation 410, light is generated in response to the light-emitting voltage converted into an analog signal. Light is generated in response to the light-emitting voltage generated in operation 404. Meanwhile, an actual current corresponding to the quantity of light is output.

In operation 412, the actual current corresponding to the quantity of light is converted into the digital value. In order to perform operation 412, an analog/digital (A/D) converter which converts the actual current into a digital value corresponding to the actual current, is used.

In operation 414, the converted digital value of the actual current is provided a predetermined number of times, an average value of the digital values is detected, and the method returns to operation 400. Due to noise from the outside, the digital value of the actual current may be abnormal. Thus, digital values of the actual current which correspond to several tens or several hundreds of times of one input current, are input, and the input digital values of the actual current are averaged.

Operations other than operation 410 are performed by the main controller 100, and operation 410 is performed by the LSU 200.

As described above, in the method and apparatus for controlling light power according to the present invention, the quantity of light is controlled freely by a main controller such that the concentration of a printing material is controlled even when a printing device operates, the present invention is easily applied to a variety of models in which the quantity of light varies and an operation of fixing a variable resistor to be performed for assembling an existing laser scanning unit (LSU) is not required.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus controlling a light power in a printing device having a main controller controlling a laser scanning unit, the apparatus comprising:

a light generator generating light and disposed inside the laser scanning unit;

a light power controller controlling a quantity of light generated by the light generator, the light power controller disposed inside the main controller, and the main controller disposed outside the laser scanning unit, the light power controller including: an error value detector subtracting a digital value of a feedback actual current from a digital value of an input current corresponding to a reference quantity of light emitted from a laser diode and outputting a digital value of an error current, a light-quantity adjusting unit generating a digital value of a light-emitting voltage for emitting light from the laser diode using the digital value of the error current, the light-quantity adjusting unit being a proportional integral controller, a value continuous converter converting the digital value of the light-emitting voltage into an analog signal and outputting the analog signal to the light generator, the light generator generating the light in response to the analog signal and outputting an actual current, and a continuous discrete converter converting the actual current into a digital value of the actual current and determining the feedback actual current; and a clamping unit clamping the digital value of the light-emitting voltage generated by the light-quantity adjusting unit at a constant level.

2. The apparatus of claim 1, further comprising an average value detector into which the digital value of the actual current is input a predetermined number of times and which detects an average value of the input digital values.

3. The apparatus of claim 1, wherein the main controller is an application specific integrated circuit (ASIC).

4. The apparatus of claim 1, wherein the light generator includes a fixed resistor.

5. The apparatus of claim 1, wherein the digital value of the light-emitting voltage is generated by multiplying the digital value of the error current detected by the error value detector by a proportional constant, multiplying an accumulated value of the digital value of the error current by an integral constant, and adding the two multiplied values to each other.

6. A method of controlling a light power performed in a printing device having a main controller controlling a laser scanning unit, the method comprising:

determining whether a digital value of an input current corresponding to a reference quantity of light emitted from a laser diode is provided;

if it is determined that the digital value of the input current is provided, subtracting, via an error value detector in a light power controller disposed inside a main controller that is disposed outside of a laser scanning unit housing the laser diode, the digital value of a feedback actual current from the digital value of the input current and outputting a digital value of an error current;

generating a digital value of a light-emitting voltage for emitting light from the laser diode using the digital value of the error current;

converting the digital value of the light-emitting voltage into an analog signal;

generating light in response to the analog signal and outputting an actual current; and converting the actual current into a digital value and determining whether the digital value of the input current corresponding to the reference quantity of light emitted from the laser diode is provided;

wherein the determination of whether the digital value of an input current is provided, the subtracting of the digital value of the feedback actual current from the digital value of the input current, the generation of the digital value of the light-emitting voltage, the converting of the digital value of the light-emitting voltage into an analog signal and the converting of the actual current into a digital value are performed by the main controller, and wherein the light power controller controls a quantity of light generated by a light generator disposed inside the laser scanning unit.

7. The method of claim 6, wherein the digital value of the light-emitting voltage is obtained by:

$$y = K_p \times E + K_i \times \int E\, dt$$

wherein y is the digital value of the light-emitting voltage, E is a digital value of the error current, $K_p$ is a proportional constant of a proportional integral controller, and $K_i$ is an integral constant of the proportional integral controller.

8. The method of claim 7, wherein the digital value of the light-emitting voltage is fixed at a constant level.

9. The method of claim 7, wherein after converting the actual current into the digital value, the digital value of the actual current is provided a predetermined number of times and an average value of the digital values is detected.

10. The method of claim 6, wherein the digital value of the light-emitting voltage is generated by multiplying the digital value of the error current by a proportional constant, multiplying an accumulated value of the digital value of the error current by an integral constant, and adding the two multiplied values to each other.

11. An apparatus having a main controller and a light generator, the apparatus comprising:

a light power controller disposed inside the main controller and controlling a quantity of light generated by the light generator, the light generator outputting an actual current corresponding to the quantity of generated light, the main controller being outside of the light generator, the light power controller including an error value detector subtracting a digital value of a feedback actual current from a digital value of an input current corresponding to a reference quantity of light emitted from a laser diode and outputting a digital value of an error current, a light-quantity adjusting unit generating a digital value of a light-emitting voltage using the digital value of the error current, the light-quantity adjusting unit being a proportional integral controller, a value continuous converter converting the digital value of the light-emitting voltage into an analog signal and outputting the analog signal to the light generator, the light generator generating the light in response to the analog signal and outputting an actual current corresponding to the quantity of generated light, and a continuous discrete converter converting the actual current output by the light generator into a digital value of the actual current used for determining the feedback actual current; and a clamping unit clamping the digital value of the light-emitting voltage generated by the light-quantity adjusting unit at a constant level, wherein the digital value of the light-emitting voltage I is obtained by:

$$y = K_p \times E + K_i \times \int E\,dt$$

wherein y is the digital value of the light-emitting voltage, E is a digital value of the error current, Kp is a proportional constant of a proportional integral controller, and Ki is an integral constant of the proportional integral controller.

12. The apparatus of claim 11, further comprising an average value detector calculating the feedback actual current.

13. The apparatus of claim 11, wherein the main controller is an application specific integrated circuit (ASIC).

14. The apparatus of claim 11, wherein the light generator includes a fixed resistor.

15. A method of controlling light power comprising:

determining whether a digital value of an input current corresponding to a reference quantity of light emitted from a laser diode is provided;

if it is determined that the digital value of the input current is provided, subtracting, via an error value detector in a light power controller disposed inside a main controller that is disposed outside of a laser scanning unit housing the laser diode, a digital value of a feedback actual current from the digital value of the input current and outputting a digital value of an error current;

generating a digital value of a light-emitting voltage using the digital value of the error current;

converting the digital value of the light-emitting voltage into an analog signal;

generating light in response to the analog signal and outputting an actual current corresponding to the generated light;

converting the actual current into a digital value of the actual current; and calculating a digital value of the feedback actual current using average values of the digital value of the actual current, wherein the light power controller controls a quantity of light generated by a light generator disposed inside the laser scanning unit, and wherein the digital value of the light-emitting voltage I is obtained by:

$$y = K_p \times E + K_i \times \int E\,dt$$

wherein y is the digital value of the light-emitting voltage, E is a digital value of the error current, Kp is a proportional constant of a proportional integral controller, and Ki is an integral constant of the proportional integral controller.

16. The method of claim 15, wherein if determined that the digital value of the input current is provided, determining whether the digital value of the input current is selected by a manipulation key or an input current selector.

17. The method of claim 15, wherein if determined that the digital value of the input current is not provided, terminating the control method.

* * * * *